UNITED STATES PATENT OFFICE.

GEORGE H. KALTEYER, OF SAN ANTONIO, TEXAS, AND GEORGE W. BARTHOLOMEW, JR., OF BELLEFONTAINE, OHIO; SAID KALTEYER ASSIGNOR TO HARRY S. BARTHOLOMEW, OF BRISTOL, CONNECTICUT.

PROCESS OF PREPARING AND TEMPERING SLURRY FOR PORTLAND CEMENT.

SPECIFICATION forming part of Letters Patent No. 460,509, dated September 29, 1891.

Application filed July 21, 1890. Serial No. 359,438. (No specimens.)

*To all whom it may concern:*

Be it known that we, GEORGE H. KALTEYER, a citizen of the United States, residing at San Antonio, in the county of Bexar and State of Texas, and GEORGE W. BARTHOLOMEW, Jr., a citizen of the United States, residing at Bellefontaine, in the county of Logan and State of Ohio, have invented certain new and useful Improvements in the Process of Preparing and Tempering Slurry for Portland Cement, of which the following is a specification.

The object of our invention is to expedite the process of production and to produce a uniform quality of cement.

Portland cement contains from seventy-two to seventy-seven parts, by weight, of dry lime and from twenty-three to twenty-eight parts of dry clay. We take about seventy-five parts of soft, damp, or wet calcareous material to about twenty-five parts of soft, damp, or wet clay—as, for instance, soft calcareous material and clay with the natural moisture that they have when freshly dug—and immediately mix them by breaking, stirring, or cutting up and working by any suitable means—as, for instance, a mixing pan or mill—so that every part of the mass has the same proportions. The fine clay and calcareous material such as we prefer to use requires about forty per cent. of water in order to properly temper it for working into brick for burning and grinding. Generally the freshly-dug materials will have about this proportion of water. The requisite percentage of water cannot be given for materials from all beds, further than that they require sufficient to properly temper them. Materials from some beds will temper with much less water than those from other beds. If freshly-dug materials do not contain the requisite amount of water, more water or more material may be added. When the material is properly mixed, we take a small quantity of the tempered material, leaving the mass in the mixer, and determine the chemical proportions by any ordinary quantitative chemical analysis—as, for instance, dry, weigh, triturate with hydrochloric acid, and measure the carbonic acid evolved, also the acid used to determine the carbonates. Filter and weigh filtrate for the silica, alumina, sesquioxide of iron, &c., and if not in proper proportions the necessary material is supplied to the mass in the mixer and worked in with the rest. Materials from different beds will vary considerable, so that different proportions will be required in order to produce the best results. If the proportion of seventy-five to twenty-five above given should upon trial be found to be far out of the way for material coming from certain beds, it can readily be changed, so as to avoid the addition of a large quantity of material for correction after testing each mass in the mixer. The tempered slurry is then made into bricks for burning and grinding into Portland cement in the ordinary manner. The material, if tested in the pan, might be proportioned at first by measure instead of weight.

The amount of water from time to time and the materials themselves will vary in different parts of the bed, and therefore if in testing the tempered slurry the proportions are found to be wrong they may be changed not only in the tempered slurry to correct that particular batch, but we may also change them when the materials are weighed out for the succeeding batches. For instance, if that part of the bed from which the calcareous material is then being taken contains more than the usual amount of clay, then proportionally less clay will be weighed out; or, if either material contains an unusual amount of water, then proportionally more of that material will be taken, and so on, until upon testing the tempered slurry the proportions will be found to be correct; or, if incorrect, then the proportions at the start may be again changed.

By using soft and damp or wet material and mixing the clay and calcareous material when in their natural state without previously drying or other working than digging, carting, and weighing, we effect a considerable saving of time in the production of the cement. By testing a small quantity of the tempered material and holding the mass in the mixer until tested we are enabled to get the proper proportions for making a uniform quality of cement, although the same is made in a short time from freshly-dug material.

By mixing the fresh materials in proportions determined by weight we are enabled to approximately get the proper proportions at the start, so that any correction in proportions can easily be made, if necessary, when the tempered material is tested, and oftentimes the proportions as weighed out will be found to be correct.

We claim as our invention—

1. In the process of preparing and tempering slurry for Portland cement, the process of mixing and correcting the proportions, which consists of taking soft, damp, or wet freshly-dug and unprepared clay and soft, damp, or wet freshly-dug and unprepared calcareous material in substantially the proportions herein set forth, mixing and working the same when fresh, testing a portion thereof to ascertain the proportions of the mass, and then, if necessary, correcting the proportions by adding material, as described.

2. In the manufacture of Portland cement, the process of preparing and tempering slurry, which consists in mixing, in proportions determined by weight, the freshly-dug clay and limy materials, working them when soft, damp, or wet, testing a portion of the mixed mass to determine proportions, and, if necessary, adding material to attain desired proportions, substantially as described.

GEORGE H. KALTEYER.
GEORGE W. BARTHOLOMEW, JR.

Witnesses to the signature of Kalteyer:
GEO. J. F. SCHMITT,
W. C. KALTEYER.

Witnesses to the signature of Bartholomew:
J. A. MCILVAIN,
SAMUEL RANKIN.